2,752,393

TRIFLUOROMETHYL-IMINO-BISACETANILIDE AMMONIUM SALTS

Henry Martin, Schaffhausen, Switzerland, assignor to Variapat A. G., Basel, Switzerland No Drawing. Application April 14, 1951, Serial No. 221,120

Claims priority, application Switzerland April 21, 1950

3 Claims. (Cl. 260—558)

It has been found that new quaternary ammonium compounds containing the trifluoromethylgroup and showing valuable properties are obtained by reacting halogenated fatty acid amides of the type

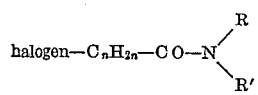

having an easily exchangeable halogen and where R represents an unsubstituted or substituted alkyl-, aralkyl-, aryl- or heterocyclic radical and R' represents hydrogen, or an alkyl, aralkyl or aryl-group with ammonia or primary, secondary or tertiary aliphatic, aliphatic-araliphatic, aliphatic-hydroaromatic, aliphatic-aromatic, araliphatic, hydroaromatic, aromatic or cyclic amines and treating the so obtained primary, secondary and tertiary amino fatty acid amides with alkylating- or aralkylating agents to obtain the corresponding quaternary compounds. It is a requirement of this invention that in all the above mentioned reactions at least one component containing the trifluoromethylgroup must be used.

The halogen fatty acid amides which are used as starting material are, for instance, prepared by reacting halogen fatty acids or suitable derivatives thereof such as the esters, or halides or anhydrides with primary or secondary amines of the type

wherein R is represented by an unsubstituted or substituted alkyl-, aralkyl-, aryl or heterocyclic radical and R' means hydrogen or an alkyl-, aralkyl- or aryl radical.

By way of example there may be cited: dodecylamine, laurylamine mixture $C_8$–$C_{12}$, laurylaniline, α-phenyl-dodecylamine, p-chloro-benzyl-α-dodecylamine, 4-methyl-benzyl-α-dodecylamine, stearylamine, benzylamine, 3,4-dichlorobenzylamine, aniline, toluidine, xylidine, p-chloroaniline, o-chloroaniline, 3,4-dichloroaniline, anisidine, 2,4 - dichloroaniline, 2,5 - dichloroaniline, 3 - trifluoromethylaniline, 3-trifluoromethyl-4-chloroaniline, 3-trifluoromethyl-6-chloroaniline, 2,4,6-trichloroaniline, 3,4,5-trichloroaniline, pentachloroaniline, 4-chloro-N-ethyl-aniline, N-ethyl-o-toluidine, 2,6-dimethylaniline, 1,3-diamino - 4 - chlorobenzene, 3,4 - dichloro - N - (4' - chlorobenzyl) - aniline, 3 - trifluoromethyl - (4' - chlorobenzyl)-aniline, benzoyl-p-phenylenediamine, 4-aminodiphenyl, 4-acetamino-4'-aminodiphenyl, 4,4'-diaminodiphenyl, 4,4'-diaminostilbene, 4,4'-diaminodiphenylsulphide, 4,4'-diaminodiphenylurea, 4,4'-diaminodiphenylsulphone, 4,4'-diamino-maleic-dianilide, 4-amino-2', 4'-dichloro - diphenyl - ether, 1 - amino - 2 - methoxy - 5-trifluoromethylbenzene, 1-amino-4-trifluoro-methyl-benzene, 1-amino-2-trifluoromethyl-benzene, 1-amino-3,5-bis - trifluoromethylbenzene, 1 - amino - 2,5 - bis - trifluoromethylbenzene, 1-amino-2-chloro-5-trifluoromethylbenzene, 1-amino-2-nitro-4-benzotrifluoride, 4-chloro-2-amino-3'-trifluoromethyl-1,1'-diphenylether, 2-amino-3'-trifluoromethyl-1,1'-diphenylether, 4-amino- or 2-aminotrifluoromethylsulpho-benzene, 4-chloro-2-aminophenylmethyl-sulphone, 5,8-dichloro-1-naphthylamine, 3-chloro-4-methyl-6-methoxy-aniline, 3,4-dichloro-6-methoxyaniline, 4 - nitro - aniline, diphenylamine, 4,4' - dichloro-2-amino-1,1'-diphenylether, 4'-chloro-4-amino-diphenylsulphone, 4 - chloro - 4' - trifluoromethyl - 2' - amino-1,1' - diphenylether, 2 - aminobenzothiazol, 4 - chloro-3'-amino-diphenyleneoxide, 3-amino-phenothioxine, benzhydrylamine, 4,4'-dichlorobenzhydrylamine, 4-amino-3'-trifluoromethyl-benzanilide, 4-aminobenzene-3', 4'-dichlorosulfanilide, 4-amino-3', 4'-dichlorobenzanilide, dichlorocarbazol etc.

When diamines are caused to react there may be used one or two molecular proportions of halogen fatty acid or its derivative.

As halogen fatty acids and their derivatives one may use for example α-halogenoacetic acid, α-halogenopropionicacid, α-halogeno-palmoilfatty acid, β-halogeno-propionic acid, α-halogeno succinic acid, etc.

The preparation of the halogen fatty acid amides is performed in a manner known per se for instance by reaction of the halogenated fatty acid amides with said amines in the presence or absence of solvents.

The reaction of the halogen fatty acid amides thus obtained with the amines defined above may follow by known methods, in which primary up to quaternary amino-fatty acid amides are produced with the aid of ammonia, or primary, secondary or tertiary amines with the elimination of hydrogen halide.

The secondary and tertiary amines used in this process may be substituted on the nitrogen atom by the same or different substituents. All amines may be substituted by any substituent especially by one or more alkyl groups, halogen, trifluoromethylgroups; said amines may be of simple or complex structure and contain one or more heteroatoms.

As such amines to be used in the reaction we mentioned: Ammonia, methylamine, ethylamine, ethanol-amine, propylamine, alkylamine, isopropylamine, butylamine, amylamine, isoamylamine, hexylamine, 2-ethylhexylamine, dodecylamine, α - dodecyl - benzylamine, benzylamine, phenylethylamine, 4 - chlorobenzylamine, 3,4 - dichlorobenzylamine, benzhydrylamine, 4,4' - dichlorobenzhydrylamine, dimethylamine, diethylamine, methylethylamine, dipropylamine, methylpropylamine, ethylpropylamine, dibutylamine, diamylamine, dihexylamine, di - 2 - ethylhexylamine, methylbutylamine, di-allylamine, diethanolamine, diethylaminoethanol, dimethylaminoethanol, dipropanolamine, N-methylbenzylamine, N-methyl-4-chlorbenzylamine, N-ethyl-4-chlorbenzylamine, methylamino-acetic acid-3,4-dichloroanilide, methylamino-acetic acid-3-trifluoromethylanilide, methylamino-acetic - acid-3-trifluormethyl - 5 - chloroanilide, N - methyl - dodecylamine, N-methyl-α-dodecylbenzylamine, ω-methylamino-4-chlorobenzophenon, piperidine, 2-methylpiperidine, morpholine, tetrahydroquinoline, trimethylamine, triethylamine, N-dimethyl-benzylamine, N-dimethyl-4-chlorobenzylamine, N - dimethyl-3,4 - dichlorobenzylamine, N-diethyl-3,4-dichlorobenzylamine, dimethylaminoacetic-acid-3-trifluoromethylanilide, dimethylaminoacetic - acid-3,4-dichloranilide, dimethylaminoacetic-acid-3-trifluoromethyl-4-chloranilide, diethylaminoacetic-acid-3-trifluoromethylanilide, dimethylaminoacetic - acid - 4 - (4' - cholorophenoxy)-anilide, dimethylaminoacetic - acid-4-trifluoromethylanilide, 4-chlorophenyl-O-dimethyl-aminoethylurethane, 3-trifluoromethylphenyl-O-dimethyl-aminoethylurethane, 3-trifluoromethyl-4-chlorophenyl-O-dimethylaminoethylurethan, 3,4-dichlorophenyl-O-dimethylaminoethylurethan, ω-dimethylamino-4-chloroacetophenone, dimethylamino-acetic acid-dodecylamide, dimethylamino-dodecylamine, diethylamino-dodecylamine, N-dimethyl-α-dodecylbenzylamine, dimethylamino - ethylene-3,4-dicholorbenzamide, dimethylaminopropylene - 3,4 - dichlorobenzamide, dimethylamino - ethylen - 3 - trifluoromethylbenzenesulfamide, dimethylamino-ethylene-3-trifluoromethyl-4-chlorobenzenesulfonamide, dimethylaminoethylene-3,4-dichlorobenzenesulfonamide, diethylamino-ethylene-4-trifluoromethylbenzolsulfonamide, dimethylaminoacetic - acidphenylester, methylamino-bis-(acetic-acid - 3 - trifluoromethylanilide), N-dimethyl-4-chlorphenoxy-ethylamine, N,N'-diethylpiperazine, N,N' - di - 4-chlorobenzylpiperazine, N,N'-di(3,4-dichlorbenzyl)-piperazine, piperidinoacetic-acid-3,4-dichloranilide etc.

If for reaction between the halogen fatty acid amides and the above mentioned amines the amines are so chosen that primary, secondary or tertiary amino fatty acid amides are formed a subsequent alkylation or aralkylation is accomplished until the nitrogen atom is quaternarily substituted. This happens with the usual alkylating agents for instance with the mineral acid esters of saturated or unsaturated alcohols, for instance alkyl-, aralkyl- or alkylen-halides, halogen-hydrines, dialkylsulphates or the like, or by addition of sulphonic acid esters. Further alkylating and aralkylating agents especially for tertiary bases are halogen fatty acid esters, halogen fatty acid amides, halogen alkylurethanes, ω-halogenketones, halogenalkylcarbamides, halogenalkylethers, halogenalkylcarbonicacidesters, halogenalkylacylamides, halogenalkylesters and the like.

For all these reactions it is essential that the so obtained quaternary ammonium compounds contain at least one trifluoromethyl-group. By suitably selecting the components needed in the synthesis one will be able to obtain specific ammoniumcompounds containing trifluoromethylgroups and having special properties. So the trifluoromethylgroup may be contained primarily in the halogen fatty acid amides as for example in chloroaceto - 3 - trifluoromethylanilide, chloroaceto - 3 - trifluoromethyl - 4 - chloroanilide, α - chloropropionyl - 3 - trifluoromethylanilide, chloroaceto-4-trifluoromethylanilide and the like. But the trifluoromethylgroup may as well be contained in one of the aralkylating agents as for example in halogen fatty acid-3-trifluoromethylanilide, 3-trifluoromethyl - 4 - chlorophenyl - O - chloro - ethylurethane and the like.

According to a further embodiment of the present invention for preparing ammonium compounds containing trifluoromethyl-groups, halogen fatty acid esters having a halogen substituent which is capable of reaction are used instead of halogen fatty acid amides. With such esters as for example chloroacetic acid -phenolesters quaternary amino-fatty-acidphenolesters are then formed. Said esters may be subsequently aminated into the claimed quaternary amino-fatty-acid-amides containing trifluoromethylgroups by treating them for example in aqueous or aqueous-alcoholic solution or emulsion with amines as for example 3-trifluoromethylaniline whereby the phenol is exchanged.

The new class of quaternary amino fatty-acid-amides containing trifluoromethylgroups may be used for various purposes. By suitable choice of the components one may obtain for example outstanding auxiliaries for textile use as products for protecting wool, furs, feathers and the like from moths and other wool pests as anthrenus and attagenus. Due to their marked efficiency the new ammonium compounds containing trifluoromethylgroups are distinguished over other products which have been already proposed for similar purposes. By a suitable substitution one obtains fungicides and bactericides for diverse fields of application. They may be used as textile aids or in the proper pest control, for treating seeds or protecting plants.

In the following examples the parts are parts by weight except where otherwise stated.

*Example 1*

(a) 50 parts of dimethylamino - aceto-3-trifluoromethyl-4-chloranilide prepared by a known process from 3-trifluoromethyl-4-chloroaniline and chloroacetylchloride and reacting the chloroaceto-3-trifluoromethyl-4-chloroanilide with dimethylamine, are stirred with a small excess of 4-chlorobenzylchloride in 200 parts acetic ether or benzene during 12 hours at 60° C. A white powder precipitates which is filtered off by suction, washed with ether and dried in a vacuum. The new compound is soluble in water and gives clear solutions. Its formula is as follows:

(1)

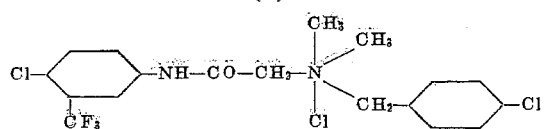

(b) If an equivalent amount or an excess of 3,4-dichloro-benzylchloride is used instead of p-chlorobenzylchloride the product corresponds to the following formula:

(2)

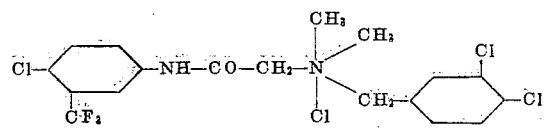

*Example 2*

(a) 25 parts dimethylamino-aceto-3-trifluoromethylanilide prepared in a manner known per se from trifluoromethylaniline and chloroacetylchloride and treating the chloroaceto-3-trifluoromethylanilide with dimethylamine, are boiled with the calculated amount of chloroaceto-4-chloroanilide in 200 parts acetic ether over night. A white powder precipitates which is filtered off by suction, washed with acetic ether and ether and then dried in a vacuum. The new quaternary compound corresponds to the following formula:

(3)

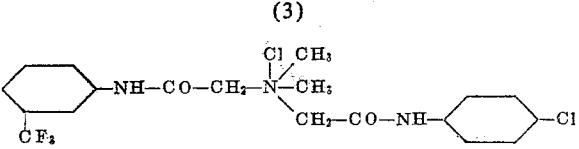

(b) If chloroaceto-3,4-dichloroanilide is used as aralkylating agent a new quaternary compound of the following formula is obtained:

(4)

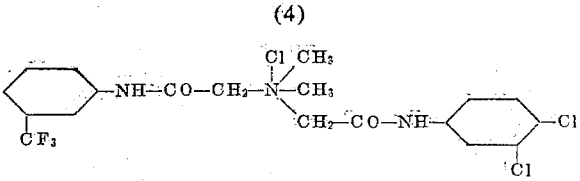

(c) If chloroaceto-3-trifluoromethylanilide is used as aralkylating agent the new quaternary compound corresponds to the following formula:

(5)

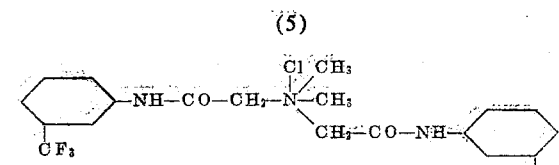

(d) If chloroaceto-3-trifluoromethyl-4-chloroanilide is used as aralkylating agent a new quaternary compound of the following formula is obtained:

(6)

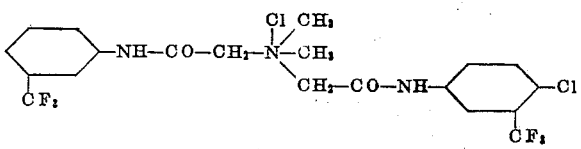

Example 3

Equimolecular amounts of dimethylamino-aceto-3-trifluoromethyl - 4 - chloroanilide and chloroaceto-3-trifluoromethyl-4-chloroanilide are boiled in acetic-ether over night, whereby a product which is difficultly soluble in water is separated. This product is filtered by suction washed with acetic-ether and ether; it corresponds to the following formula:

(7)

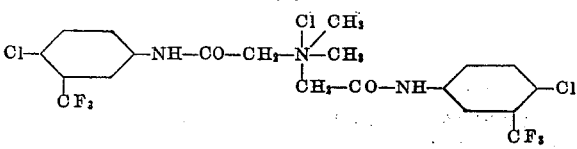

Example 4

(a) 15 parts α - dimethylamino-propionic-acid-3-trifluoromethyl-4-chloroanilide are dissolved in acetic-ether together with an excess of 3,4-dichlorobenzyl-chloride and boiled with reflux during 12 hours. A white powder is precipitated which is filtered off, washed with acetic-ether and ether and then dried. It corresponds to the following formula:

(8)

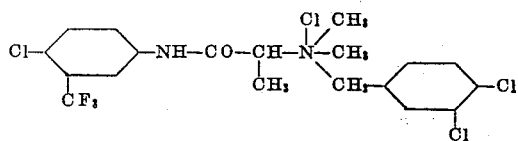

(b) If chloroaceto-3-trifluoromethylanilide is used instead of 3,4-dichlorobenzylchloride one obtains a compound of the following formula:

(9)

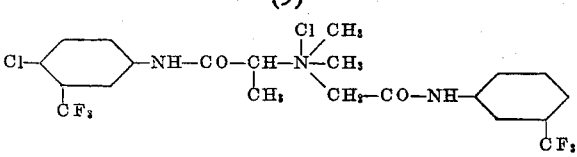

Example 5

(a) Equimolecular amounts of diethylamino-aceto-3-trifluoromethyl-4-chloroanilide and chloroaceto - 3,4 - dichloroanilide are dissolved in acetic-ether and then heated with reflux during 12 hours. A white precipitate is separated, filtered and washed with acetic-ether and ether. The product obtained corresponds to the following formula:

(10)

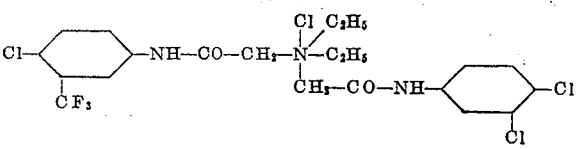

(b) By similar reaction between diethylaminoaceto-3-trifluoromethylanilide and chloro-aceto-3-trifluoromethyl-4-chloroanilide a product of the following formula is obtained:

(11)

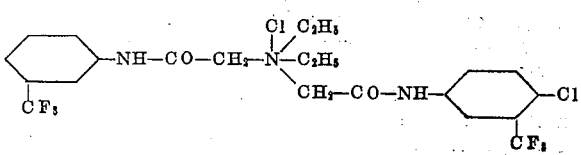

Example 6

20 gms. of dimethylamino-aceto-3-trifluoro-methyl-4-chloroanilide and ω-chloro-4-chloroacetophenone are dissolved in acetic-ether and boiled several hours. Thereby a new quaternary compound of the following formula is precipitated:

(12)

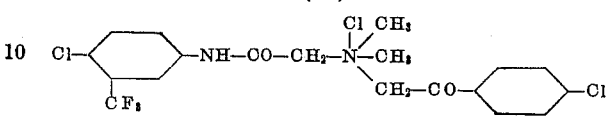

Example 7

Equimolecular amounts of dimethylamino-aceto-3-trifluoromethyl-4-chloroanilide and chloroaceto-3,4-dimethylanilide are dissolved in acetic-ether and heated with reflux during several hours. A new quaternary compound of the formula:

(13)

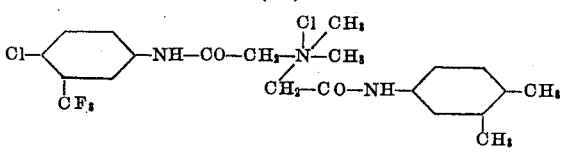

separates out.

Example 8

(a) Equimolecular amounts of dimethylamino-aceto-3-fluoromethyl-4-chloroanilide and 4-chloro-phenyl-O-chloroethyl-urethane are dissolved in chlorobenzene and heated during 24 hours with reflux. The precipitate is filtered, washed with chlorobenzene and dried, it corresponds to the following formula:

(14)

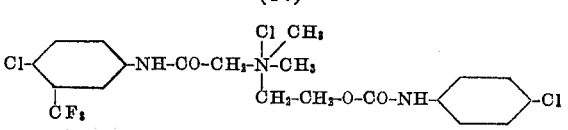

The same product is obtained by condensation of 4-chlorophenyl-O-dimethylamino-ethylurethane with chloro-aceto-3-trifluoromethyl-4-chloroanilide.

(b) By a similar reaction of dimethylamino-aceto-3-trifluoromethylanilide with 3-trifluoromethyl - 4 - chlorophenyl-O-chloroethyl-urethane or of 3-trifluoro-methyl-4-chlorophenyl-β-dimethylamino-ethylurethane with chloroaceto-3-trifluoromethylanilide a quaternary compound of the following formula is obtained:

(15)

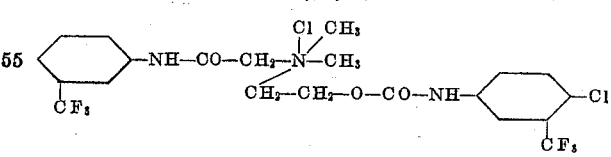

(c) By a similar reaction of dimethylamino-aceto-3-trifluoromethyl-4-chloroanilide with 3 - trifluoromethylphenyl - O - chloroethylmethane or of 3-trifluoromethylphenyl-O-dimethylamino-ethylurethane with chloro-aceto-3-trifluoromethyl-4-chloro-anilide a quaternary compound of the following formula is obtained:

(16)

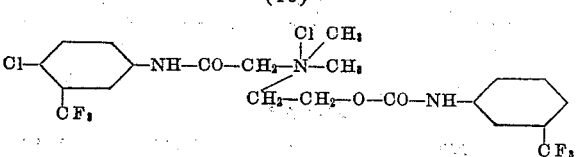

(d) By a similar reaction of 3-trifluoromethyl-4-chlorophenyl - O - dimethylaminoethyl-urethane with chloroaceto-3,4-dichloroanilide a compound of the following formula is obtained:

(17)

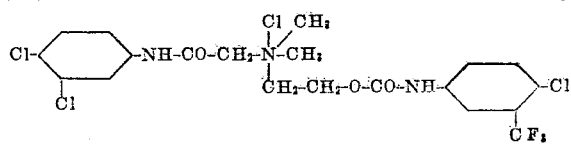

Example 9

(a) 20 gms. of dimethylamino-ethylene - 3 - trifluoromethyl-4-chlorophenyl-sulfamide prepared by interaction of 3 - trifluoromethyl - 4 - chlorobenzenesulfochloride on asymmetric dimethylethylenediamine, and the calculated corresponding amount of chloroaceto-3-trifluoromethylanilide are dissolved in acetic-ether and boiled during 12 hours with reflux, a white powder thereby separates out. It is filtered and washed with acetic-ether and has the following formula:

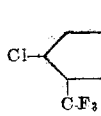 (18)

(b) By a similar reaction of dimethylamino-ethylene-3-trifluoromethyl-4-chlorophenylsulfonamide with chloroaceticacid-3,4-dichloroanilide the product of condensation of the following formula is produced:

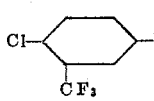 (19)

Example 10

25 gms. of dimethylamino-propylene-3,4-dichlorobenzamide prepared from 3,4-dichlorobenzoylchloride and asym. dimethylaminopropylamine are reacted with the calculated amount of chloroaceto-3-trifluoromethyl-4-chloroanilide in acetic-ether during several hours with reflux. The powder precipitated is filtered off, washed with acetic ether and dried; it corresponds to the following formula:

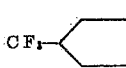 (20)

Example 11

(a) 15 gms. chloroaceto-3-trifluoromethylanilide and the calculated amount of dimethylamino-aceto-4-(4'-chlorophenoxy)-anilide are dissolved in 100 parts of acetic-ether and heated 24 hours with reflux. Then the solvent is removed. The product is recrystallised from diluted alcohol and corresponds to the following formula:

 (21)

(b) By similar reaction of chloroaceto-3-trifluoromethyl-4-chloroanilide with dimethylamino-aceto-3-chloro-4-(4'-chlorophenoxy)-anilide or of dimethyl-amino-aceto-3-trifluoromethyl-4-chloronanilide with chloroaceto-3-chloro-4-(4'-chlorophenoxy)-anilide a product of the following composition is obtained:

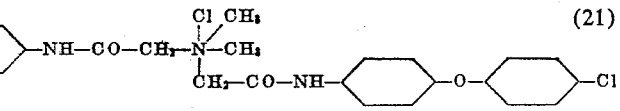 (22)

(c) By a similar reaction between chloroaceto-3-trifluoromethyl-4-chloroanilide and β-dimethylamino-propionic-acid-4-(4'-chlorophenylsulfide)-anilide the following product is obtained:

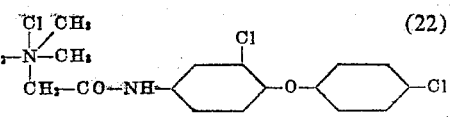 (23)

(d) By a similar reaction between chloroaceto-4-trifluoromethyl-anilide and dimethylamino-aceto-4-(4'-chlorophenoxy)-anilide a condensation product of the following formula is obtained:

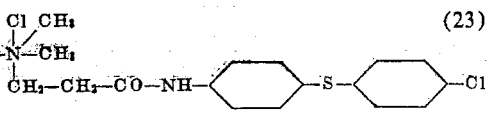 (24)

(e) By a similar condensation of chloroaceto-3-trifluoromethyl-4-chloroanilide and dimethylamino-aceto-2-(4'-chlorophenoxy)-5-chloronanilide a product of the following formula is obtained:

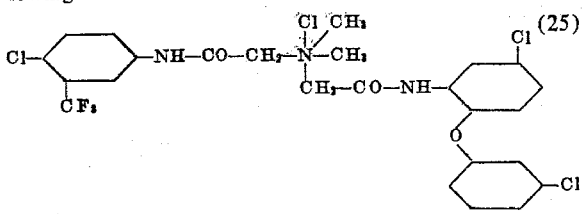 (25)

This product may also be prepared by reaction of dimethylamino-aceto-3-trifluoromethyl-4-chloroanilide with chloroaceto-2-(4'-chlorophenoxy)-5-chloronanilide.

(f) By a similar reaction of chloroaceto-3-trifluoromethyl-anilide and dimethylamino-aceto-2-(4'-chlorophenoxy)-5-trifluoromethylanilide a product is obtained which corresponds to the following formula:

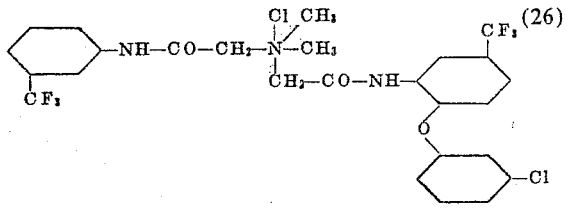 (26)

Example 12

(a) 12 gms. dimethylamino-aceto-2-chloro-5-trifluoromethylanilide and the calculated amount of chloroacetyl-4-chloroanilide are dissolved in 100 gms. acetic-ether and heated over night on a water-bath. A white precipitate is separated by filtration washed with acetic-ether and dried in vacuo.

The dimethylamino - aceto-2-chloro-5-trifluoromethylanilide used as starting material is prepared in a manner known per se from 2-chloro-5-trifluoro-methylaniline and chloroacetylchloride, e. g. in acetone as solvent and in the presence of potash-solution. By interacting the chloro-aceto-2-chloro-5-trifluoromethyl-anilide in aqueous dimethylamine solution at a temperature of about 50° C. the corresponding dimethylamino-acetic-acid-derivative is obtained.

The quaternary product of condensation has the following formula:

(27)

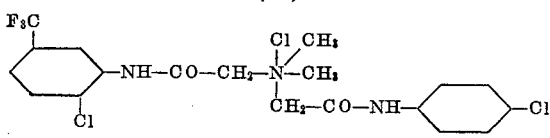

(b) By a corresponding condensation of dimethylamino - aceto - 2 - chloro - 5 - trifluoromethylanilide with chloroacetyl-3-trifluoromethyl-4-chloroanilide or of dimethylamino - aceto - 3 - trifluoromethyl - 4 - chloroanilide with chloroacetyl - 2 - chloro - 5 - trifluoro - methylanilide the product with the following constitution is obtained:

(28)

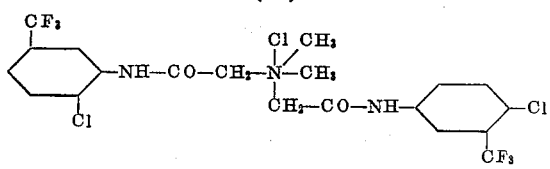

*Example 13*

(a) 50 gms. of dimethylamino-aceto-dodecylamide are dissolved in acetic-ether and reacted for 12 hours on a water-bath with the calculated amount of chloro-aceto-3-trifluoro-methyl-4-chloroanilide. The aqueous solution of the new product foams strongly. The same product is obtained by reaction of chloroacetyl-dodecylamide with dimethylamino-aceto-3-trifluoromethyl-4-chloroanilide. It corresponds to the following formula:

(29)

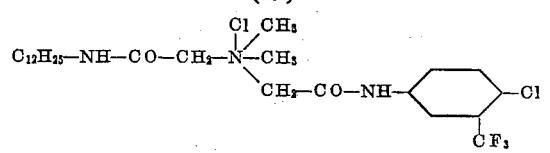

(b) If diethylamino-aceto-dodecylamide is reacted with chloroacetyl-3-trifluoromethyl-anilide, the product obtained has the following constitution:

(30)

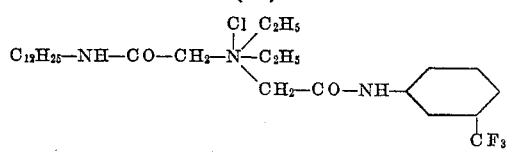

(c) If asym. dimethylamino-ethylene-palmoil-fattyacide is reacted with chloroacetic-acid-3-trifluoromethyl-4-chloroanilide in acetic-ether or benzene the quaternary ammonium salt of the following constitution is obtained:

(31)

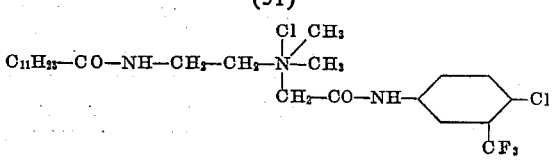

(d) 18 gms. lauryldimethylamine are heated with the calculated amount of chloroacetyl-3-trifluoromethyl-4-chloroanilide first several hours at a temperature of 60–65° C. and hereafter at a temperature of 120° C. A friable mass is obtained, which is easily soluble in water with a strong foam production.

The same compound may be obtained from dimethylamino-aceto-3-trifluoromethyl-4-chloroanilide and dodecylchloride and corresponds to the following formula:

(32)

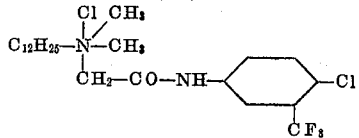

The reaction may also be executed in a solvent.

(e) By interaction of β-diethylamino-propionic-acid-3-trifluoromethylanilide with laurylbromide a product with the following constitution is obtained:

(33)

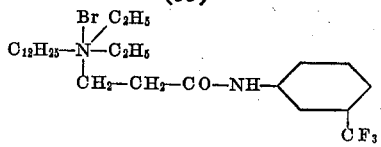

(f) 20 gms. 4-methyl-α-dodecylbenzyl-N-dimethylamine and the calculated amount of chloroaceto-3-trifluoromethyl-4-chloroanilide are heated together for several hours at a temperature of 90–95° C. then a shorter time at 120° C. without addition of a solvent until a sample is soluble in water. The quaternary compound so obtained has the following constitution:

(34)

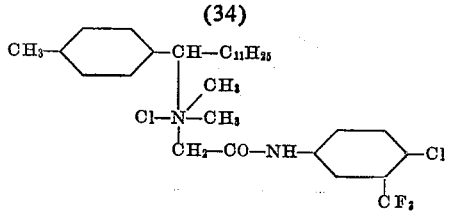

(g) 16 gms. p-tertiary-octylphenoxy-ethoxyethyl-dimethylamine and the calculated amount of chloroaceto-3-trifluoromethylanilide are dissolved in acetic-ether and heated 12 hours with reflux. A white powder precipitates, which is filtered and recrystallised from alcohol. It has the following constitution:

(35)

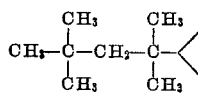

Instead of the p-tertiary-octylphenoxy-ethoxyethyl-dimethylamine one may use the p-tertiary-octyl-o-cresoxy-ethoxyethyl-dimethylamine.

(h) When asym. dimethylaminopropylene-dodecyl-sulfonamide is reacted with chloro-aceto-4-trifluoromethylanilide in acetic-ether a water soluble foaming product is obtained having the following constitution:

(36)

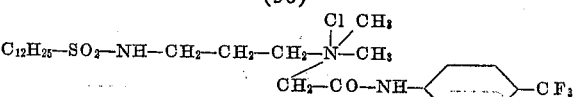

*Example 14*

(a) Equivalent amounts of dimethylamino-aceto-3-trifluoromethyl-4-chloroanilide and chloroaceto-5,8-dichloro-1-naphthylamide was stirred in chlorobenzene during 24 hours at a temperature of 105–110° C. A white powder separates out and is filtered off, washed with

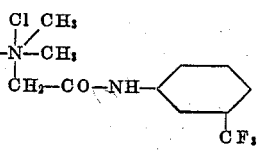

chlorobenzene and then with ether and dried. It corresponds to the following formula:

(37)

Cl—⟨  ⟩—NH—CO—CH₂—N(Cl)(CH₃)—CH₃
     |                    |
     CF₃               CH₂—CO—NH—⟨  ⟩⟨  ⟩—Cl
                                       Cl (b) If the chloroaceto-5,8-dichloro-1-naphthylamide is replaced by chloroaceto-2,4,5-trichloroaniline the following quaternary ammonium compound is formed:

(38)

Cl—⟨  ⟩—NH—CO—CH₂—N(Cl)(CH₃)—CH₃
     |                    |          Cl
     CF₃               CH₂—CO—NH—⟨  ⟩—Cl
                                       Cl (c) With chloroaceto-4-chloroanilide as an aralkylating agent one obtains:

(39)

Cl—⟨  ⟩—NH—CO—CH₂—N(Cl)(CH₃)—CH₃
     |                    |
     CF₃               CH₂—CO—NH—⟨  ⟩—Cl

Example 15

21 gms. dimethylamino-aceto-4,4'-dichlorobenzhydrylamide, prepared from 4,4'-dichloro-benzhydrylamine and chloroacetylchloride and reacting the chloroacetyl-4,4'-dichlorobenzhydrylamide with dimethylamine, are dissolved in acetic-ether, added with the calculated amount of chloroacetyl-3-trifluoromethyl-alilide and heated for 12 hours on the water-bath. Thereby the quaternary compound of the following formula is precipitated:

(40)

Cl—⟨  ⟩—CH—NH—CO—CH₂—N(Cl)(CH₃)—CH₃
         |                      |
         ⟨  ⟩               CH₂—CO—NH—⟨  ⟩—CF₃
         |
         Cl

Example 16

(a) 15 gms. chloroaceto-3-trifluoromethyl-4-chloroanilide are dissolved in alcohol and treated with a 40% monomethylamine solution while cooling with ice. The methylamino - bis - (aceto - 3 - trifluoromethyl - 4 - chloroanilide) is thus formed. The alcoholic solution is heated in a closed vessel to complete the reaction and after cooling the excess of dimethylamine is removed. The solution is diluted with water, whereby the product is completely precipitated. After crystallisation from alcohol it forms beautiful crystals.

Equimolecular amounts of this tertiary amine and dimethylsulphate are dissolved in acetic-ether and heated on the water-bath. An ammonium-compound of the following composition is obtained:

(41)

Cl—⟨  ⟩—NH—CO—CH₂—N(CH₃)(CH₃)—CH₂—CO—NH—⟨  ⟩—Cl
     |                    |                                      |
     CF₃               SO₄—CH₃                              CF₃

(b) If chloroacetyl-3-trifluoromethylanilide and methylamine are used as reactants and otherwise worked under the same conditions, methylamino-bis-(aceto-3-trifluoro-methylanilide) is obtained. Equivalent amounts of this amine and 3,4-dichlorobenzylchlorid give the following ammonium compound which is difficultly soluble in water.

(42)

⟨  ⟩—NH—CO—CH₂—N(CH₃)—CH₂—CO—NH—⟨  ⟩
 |                    |                                      |
 CF₃              CH₂                                   CF₃
                  Cl  ⟨  ⟩—Cl
                       Cl

Example 17

(a) 8 gms. dimethylamino-aceto-4-trifluoromethylanilide and an excess of 3,4-dichlorobenzyl-chloride are dissolved in chlorobenzene or toluene and stirred overnight at the temperature of the water-bath. The product of condensation precipitates in form of a white powder which is filtered by suction, washed with the same solvent and dried in a vacuum. It has the following formula:

(43)

CF₃—⟨  ⟩—NH—CO—CH₂—N(Cl)(CH₃)—CH₃
                                |           Cl
                               CH₂—⟨  ⟩—Cl (b) 8 gms. dimethylamino-aceto-4-trifluoromethylanilide are dissolved in acetic-ether and the calculated amount of chloroacetyl-3,4-dichloro-anilide added, then heated with reflux. Thereby, the new quaternary compound is precipitated. It is filtered, washed with acetic-ether and dried in a vacuum. It corresponds to the following formula:

(44)

CF₃—⟨  ⟩—NH—CO—CH₂—N(Cl)(CH₃)—CH₃
                                |                  Cl
                               CH₂—CO—NH—⟨  ⟩—Cl (c) If chloroacetyl-3-trifluoromethyl-4-chloroanilide is used instead of chloroacetyl-3,4-dichloroanilide the following quaternary compound is obtained:

(45)

CF₃—⟨  ⟩—NH—CO—CH₂—N(Cl)(CH₃)—CH₃
                                |
                               CH₂—CO—NH—⟨  ⟩—Cl
                                                    |
                                                    CF₃

Example 18

(a) 0.1 mol 3-trifluoromethyl-4-chloroaniline is dissolved in acetone and the calculated amount of chloroacetylchloride is added drop by drop. At the same time an aqueous solution of potassium carbonate is also added drop by drop in order to neutralise the hydrochloric acid. The reaction is first performed at room temperature and then on the water-bath. When the reaction has reached its end the reaction mixture is treated with an excess of water whereupon the chloroaceto-3-trifluoromethyl-4-chloroanilide precipitates. This raw product may generally be used for the reaction with amines. The reaction may also be accomplished in benzene, chlorobenzene and the like.

23 parts chloroaceto-3-trifluoromethyl-4-chloroanilide are stirred into 60 parts of an aqueous 20% dimethyl-amine-solution at room temperature and after one hour the whole slowly heated to 50° C. with reflux. The reaction has reached its end when a sample of the inhomogeneous mixture is clearly soluble in diluted hydrochloric acid. After cooling the reaction mixture which forms a semi-solid and an aqueous layer is separated and the nonaqueous layer washed with water. It generally solidifies spontaneously or after inoculation.

24 parts dimethylamino-aceto - 3 - trifluoro-methyl-4-chloroanilide and an equivalent amount chloroacetophenylester are dissolved in 200 parts acetic-ether and stirred overnight on the water-bath. A white powder precipitates, which after cooling of the reaction mixture is filtered by suction, washed with acetic-ether and dried in a vacuum. It corresponds to the following formula:

(46)

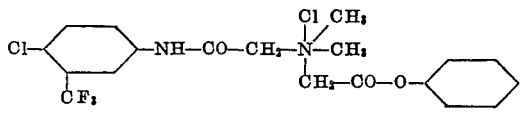

(b) If chloroaceto-3-methyl - 4 - chlorophenyl-ester is used instead of chloroacetophenylester, the following compound is obtained.

(47)

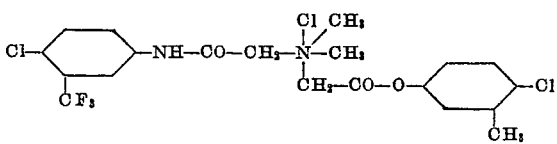

Example 19

The quaternary ammonium salt prepared according to Example 18a, is dissolved or suspended in water and an excess of 3,4-dimethylaniline is added thereto. The mixture is then boiled for several hours. More preferably the reaction is accomplished under pressure and it is then not necessary to hold the reactants in solution. When the reaction has reached its end the product is treated with steam in order to blow off the xylidine and phenol in excess. The remaining product has the same properties and constitution as that of Example 7.

Instead of 3,4-dimethylaniline other primary or secondary amines may be used for example m-chloroaniline or 3,4-dichloroaniline and the like.

Example 20

19 gms. chloroaceto-3-trifluoromethyl-4-chloroanilide are dissolved in acetic-ether and the equivalent amount of N-3,4-dichlorophenyl - N' - asym.-dimethylaminoethylurea added thereto. The mixture is held overnight at water-bath temperature, the product which is precipitated is filtered, washed with acetic-ether and then with ether and dried in a vacuum. It corresponds to the following formula:

(48)

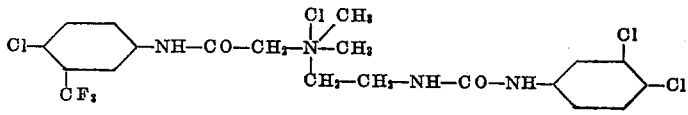

The following products of condensation may be prepared in a similar manner as indicated in the foregoing examples.

(49)

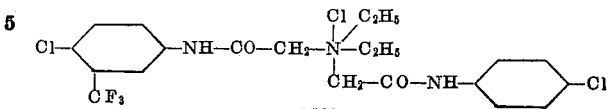

(50)

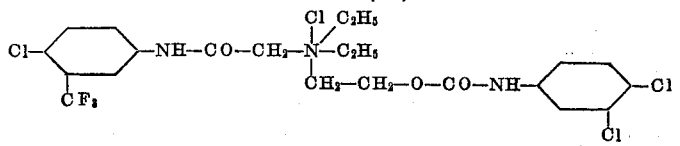

(51)

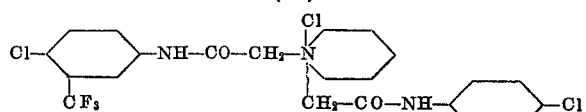

(52)

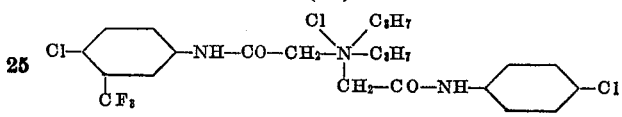

(53)

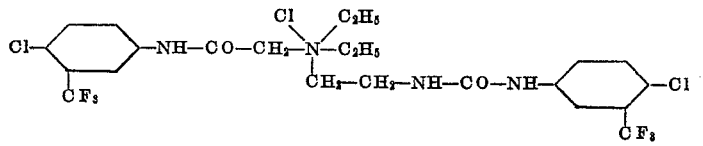

(54)

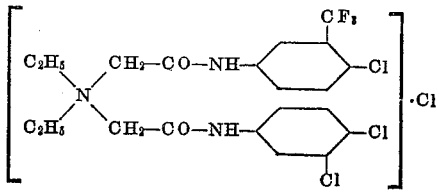

The invention is, however, not confined to the cited examples and may be extended to any other examples.

According to all processes described the halides of the quaternary compounds are generally obtained. Other salts may be prepared according to known methods for example by double decomposition with other salts.

Example 21

Articles from wool are treated in an aqueous bath at 40–60° C. with 0.5% (based on the wool) of the quaternary ammonium compound containing trifluoromethyl-groups described in Example 3. Treatment begins in a lukewarm bath whereupon the temperature is slowly raised at 40–60° C. where it is held for one hour. Then the wool is rinsed. A so treated article is moth proof and also proof against fur- and carpet-bugs.

What I claim is:

1. As new product the quaternary ammonium derivative of aminoacetic acid amide of the following formula being a white powder, clearly soluble in water and possessing valuable properties for mothproofing textiles and materials liable to damage from moths and other textile pests, the portion of the molecule within the brackets bearing a positive charge due to unsatisfied pentavalent nitrogen and the chlorine outer of the brackets bearing a negative charge.

2. The quaternary ammonium salt compound having the formula:

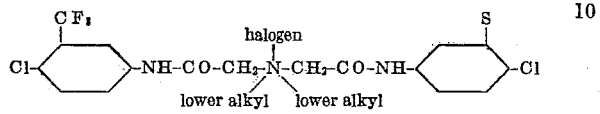

where S is a member selected from the group consisting of CF₃ and Cl.

3. A quaternary ammonium compound having the formula:

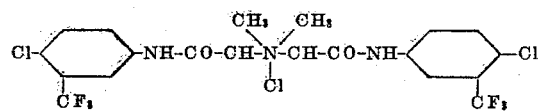

References Cited in the file of this patent
UNITED STATES PATENTS

| | | |
|---|---|---|
| 2,093,115 | Wolfram et al. | Sept. 14, 1937 |
| 2,343,071 | Martin et al. | Feb. 29, 1944 |